United States Patent [19]

Olson et al.

[11] Patent Number: 5,344,168

[45] Date of Patent: Sep. 6, 1994

[54] SNOWMOBILE SKI

[75] Inventors: Alan S. Olson; Robert W. Przekwas, both of Roseau, Minn.

[73] Assignee: Polaris Industries, L.P., Roseau, Minn.

[21] Appl. No.: 790,379

[22] Filed: Nov. 8, 1991

[51] Int. Cl.5 ............................................. B62B 17/00
[52] U.S. Cl. ................................................... 280/28
[58] Field of Search ...................... 280/845, 12.13, 16, 280/28

[56] References Cited

U.S. PATENT DOCUMENTS

| | | |
|---|---|---|
| 3,632,126 | 1/1972 | Shorrock . |
| 3,643,979 | 2/1972 | Richards . |
| 3,711,109 | 1/1973 | Hofbauer . |
| 3,718,341 | 2/1973 | Westberg . |
| 3,770,330 | 11/1973 | Bombardier . |
| 3,778,074 | 12/1973 | Kozlow . |
| 3,817,544 | 6/1974 | Labelle . |
| 3,844,367 | 10/1974 | Flohr . |
| 3,850,440 | 11/1974 | Reedy et al. . |
| 3,857,578 | 12/1974 | Alton . |
| 3,866,933 | 2/1975 | Mollring . |
| 3,870,331 | 3/1975 | Cryderman . |
| 3,877,713 | 4/1975 | Mabie et al. . |
| 3,942,812 | 3/1976 | Kozlow . |
| 3,964,561 | 6/1976 | Lunzer et al. . |
| 4,077,639 | 3/1978 | Reedy . |

Primary Examiner—Richard M. Camby
Attorney, Agent, or Firm—Fredrikson & Byron

[57] ABSTRACT

A snowmobile ski comprising a longitudinally extending runner having a bottom surface, a generally flat elongate bar having a top and bottom surface, and a steering skag extending longitudinally of the runner on the bottom side of the bar. The flat bar is generally contoured to abut the bottom surface of the runner, and furthermore extends forwardly beyond the skag and laterally and longitudinally beyond the skag so that a skag track in the snow encountered by the ski and the skag track left by the skag in the snow will be at least partially filled in by the bar.

16 Claims, 5 Drawing Sheets

SNOWMOBILE SKI

TECHNICAL FIELD

The invention relates to snowmobiles, and in particular to snowmobile skis having skags for steering the snowmobile.

BACKGROUND OF THE INVENTION

This invention relates to improving the steerability of a snowmobile and more particularly to eliminating the problem of snowmobile ski darting and tracking.

Snowmobile skis typically have elongated steering skags carried on the bottom of the ski that act as a type of keel to increase the bite of the ski in the snow when the ski is turned. Ski skags leave an impression in the snow corresponding to the profile of the ski and skag. Particularly in wet or compacted snow, a snowmobile ski coming upon the impression left by a previous snowmobile ski will tend to follow the same track (especially if the temperature has dropped causing the wet snow to freeze). This effect is known as Tracking or darting. Darting forces the snowmobile operator to compensate or correct for the tracking steering forces by oversteering the vehicle to maintain directional stability. Darting can be quite severe particularly if the snow containing the initial track was wet and has refrozen (such as on a sunny winter day followed by a cold night—typical snowmobiling weather).

The skag of a snowmobile following such a track will naturally situate itself in the previous impression and a considerable effort is required to steer out of such a track. Over time, darting can cause the driver to become fatigued from the effort of steering.

A need exists, therefore, for a snowmobile ski that eliminates the problem of darting. Ideally, such a ski would not only be able to steer easily despite encountering a skag impression but would also leave little skag impression behind it so that later machines that come upon the track will not dart.

SUMMARY OF THE INVENTION

The invention provides a snowmobile ski capable of lessening the effects of darting. The ski includes a typical longitudinally extending runner having a bottom surface. A generally flat elongate bar, having top and bottom surfaces, is mounted on the bottom surface of the runner, the bar being generally contoured to abut the bottom surface of the runner. A short steering skag extends longitudinally of the runner on the bottom surface of the bar.

The flat bar preferably extends laterally, rearwardly and forwardly of the shorter skag. The portion of the bar that extends forward of the skag acts to break up and partially fill in a skag impression in the snow encountered by the ski so that darting will be reduced or eliminated. The portion of the bar that extends rearward of the skag acts to at least partially fill in the track left by the skag in the snow so that the next snowmobiler to encounter the skag impression will have less tendency to dart, even if it is not equipped with the ski of the invention.

The flat bar extending laterally and longitudinally beyond the skag also covers and protects the areas of the ski runner that are subject to severe wear. The bar, which is substantially thicker than the runner, wears instead of the runner, and is cheaper to replace and easier to install than the runner.

BEST MODE FOR CARRYING OUT THE INVENTION

The snowmobile ski of the present invention is generally designated 10 and is usable on conventional snowmobiles. Such skis may be attached to a snowmobile (not shown) in a variety of ways well-known in the art.

Figure 1:
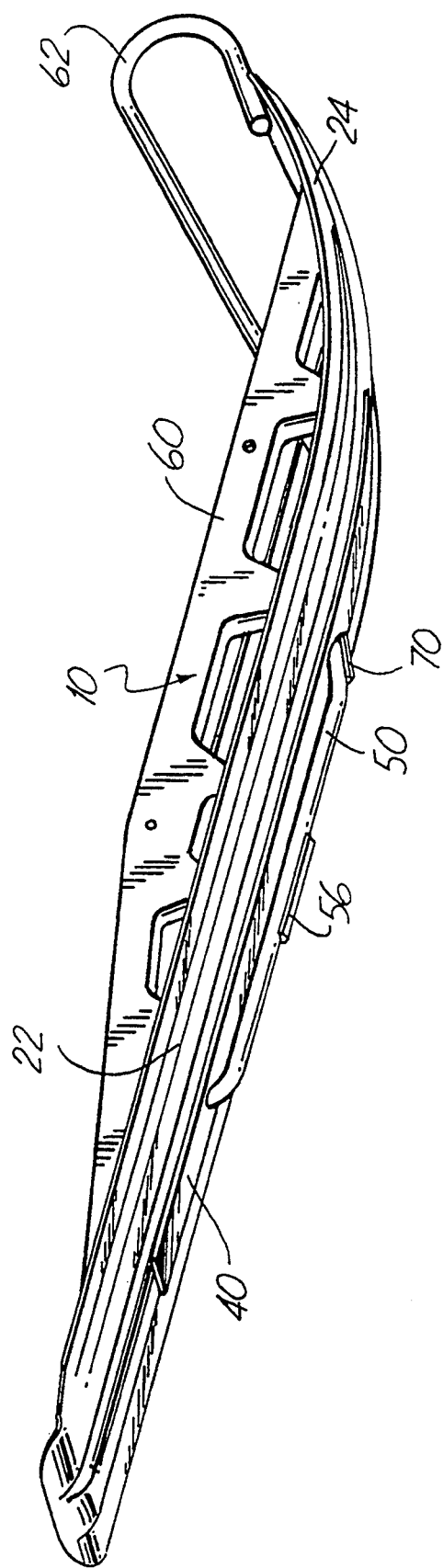
FIG. 1 is a perspective view of a ski of the invention, taken from below and slightly behind the ski.
Figure 2:
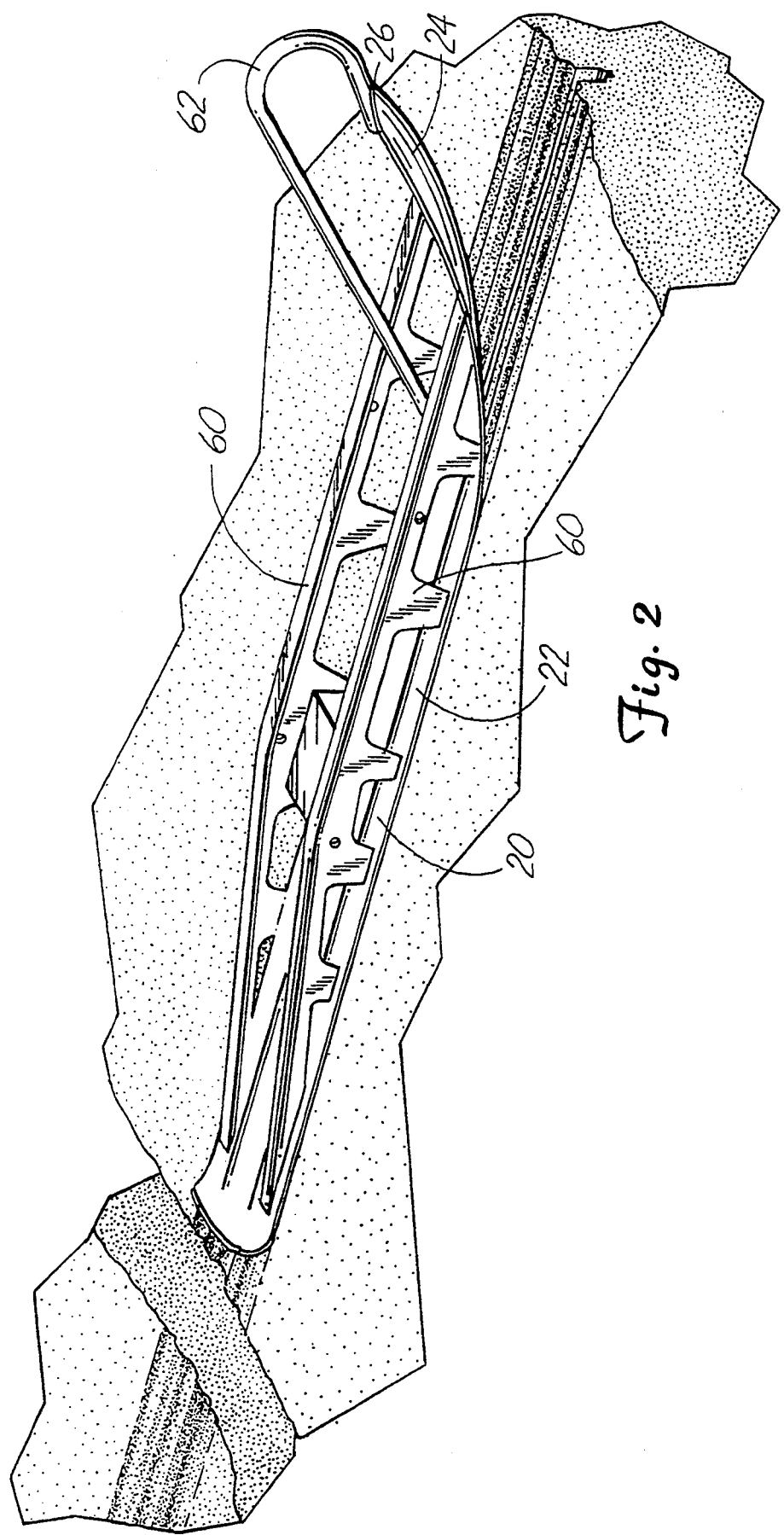
FIG. 2 is a perspective of the ski of the invention following the track left by a prior art ski in the snow, showing the prior art track profile and the track left by the ski of the invention.
Figure 3:
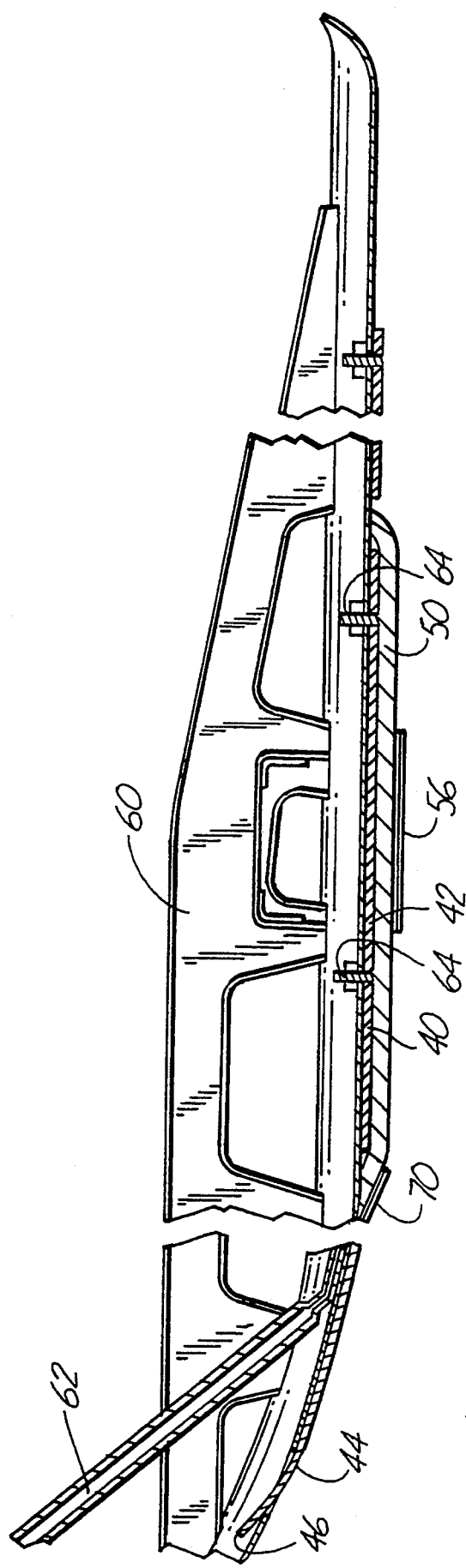
FIG. 3 is a longitudinal cross-sectional view of the ski of the invention.

Referring to FIGS. 1-3, the ski 10 of the present invention includes a runner 20, a generally flat bar 40 and a skag 50. The runner 20 typically is symmetrical from side to side and consists of an elongated body 22 with an upwardly curved forward portion 24 that terminates in a rounded tip 26.

A variety of ski profiles may be utilized. In one embodiment, the runner 20 contains a depressed central trench 28 having a flat floor 32 that runs longitudinally along its entire length. The trench 28 is centrally situated at the base of a larger, generally U-shaped valley 34 which also runs the entire longitudinal length of the runner 20.

The ski typically includes two reinforcing beams 60 that run along the length of the runner's body 22 and attach to the curved region 24. The runner 20 may also contain a curved rod 62 attached between the tip 26 and the body 22. This rod 62 gives structural support to the front curved portion 24 and serves as a handle that allows the operator to manually move the skis.

In the typical configuration of the prior art, the skag 50 is attached to the underside of the runner 20. The present invention includes a flat bar 40 that can be inserted onto skis currently in use. To better illustrate the adaptability of the present invention and to detail the best mode of its use, the basic design of most snowmobile skis will first be described followed by the bar's relationship to them.

The skag 50 of a typical prior art ski is configured to abut the underside of the central trench 28 of the runner 20. Although any suitable cross section will suffice, the skag 50 usually is made of a round rod having a diameter of about 7/16 inches and ⅜ inches. A diameter of 7/16 inches is preferred.

In the most common embodiment, the skag 50 is about 27 inches long, extending nearly the entire length of the trench 28 (but not beyond the end of the runner 20). The front portion of the skag 50 extends typically beyond the flat body portion 22 of the runner 20 to cover and protect the lower portion of the runner's curved section 24 which is subject to wear.

Snowmobile skags can be attached to their runners by any suitable method. One preferred way is by the use of a set of threaded shafts 64 extending vertically up from the horizontal skag, through the runner 22. A correspondingly threaded nut 65 secures the shaft 64.

The curved front portion of the skag 50 typically is attached to the runner 20 by inserting the end of the skag 50 through a hole formed in the runner 20. If desired, threaded screws or bolts can be used at locations along the skag's upper surface to further secure the skag to the runner. Any other suitable attachment means may also be utilized.

Figure 4:
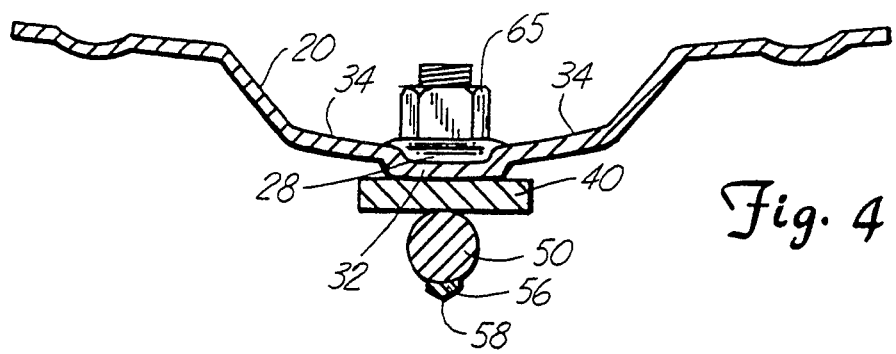
FIG. 4 is a transverse cross-sectional view of the ski of the invention.
Figure 5:
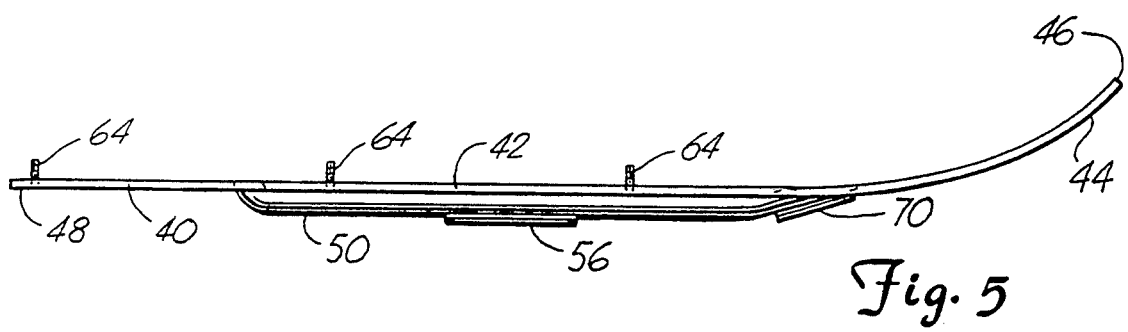
FIG. 5 is a side view of the skag and bar of the invention.

The present invention provides an elongate flat bar 40 mounted between the skag 50 and the runner 20. Like the skag, the bar 40 (FIGS. 4 and 5) is contoured to abut the underside of the central trench 28 of the runner 20. Preferably the bar has a generally rectangular cross section, and the bar should be of a sufficient length so that it extends forwardly of the skag 50 (so that it at least partially fills in an existing track in the snow ahead of the ski's skag 50) and rearwardly behind the skag 50 (so that it at least partially fills in the track left by the skag 50. The bar 40 should also be wider than the diameter of the skag 50 so that sides of the bar extend wider than the skag beneath it (to disturb the shoulders tending to fill in the track left by the skag). Moreover, the bar should be at least about ⅛ inches thick—preferably at least about 3/16 inches, and the side edges of the bar should be relatively sharp to give the desired effect on the snow—desirably less than ⅛ inches radius, and preferably less than 1/16 inches.

As the bar 40 is contoured to follow the underside of the trench 28, it consists of a generally straight body 42 and an upwardly curved forward portion 44. The bar 40 extends forwardly along the underside of the body 22 of the runner 20. The bar's curved section 44 continues to extend upward, flush with the curved forward portion 24 of the runner 20, and preferably contains a tapered section 45 that terminates in a blunt point 46 (FIG. 3). The tapered point 46 is desirably inserted through the runner 20 and attached to the runner 20 in a similar manner as the skag 50. In the preferred embodiment, the bar's rear tip 48 contains a threaded shaft 64 similar to the one in the skag 50. A threaded nut secures the shaft 64 to the runner 20.

Although it is envisioned that snowmobile skis can be manufactured with the bar 40 as original equipment, (even perhaps as an integral component of a composite-based ski), the bar can also easily be retrofitted to most currently available machines. The bar 40 is easily adaptable to fit most snowmobile runners. The means by which the bar 40 is attached to the runner 20 can be made to match those that were previously used to attach the skag 50 to the runner 20, of which a preferred method was detailed above. The old skag 50 can be removed from the runner by unscrewing the nuts securing it and pulling the skag from the hole in the front of the runner. The tapered point 46 of the bar 40 is then inserted into the hole in the runner 20 where the skag was previously located, and a threaded shaft 66 at the rear of the bar 40 is secured to the runner.

A shorter skag 50 of the invention is then positioned beneath the central portion 42 of the bar 40. In the preferred embodiment, a skag of a considerably shorter length is used under the bar replacing the longer ones of the prior art. The length of a typical skag for use with the bar is between about 7/16 inches and ⅞ inches, with 14 inches the preferred length.

The skag 50 desirably abuts the underside of the bar 40 and is thus configured accordingly. It can be secured to the runner through the use of threaded shafts 64 that extend upwardly through holes 67 in the flat bar 40 and runner 20. A nut 65 is threadingly received by each of the shafts 64 on the top side of the runner 20; while the skag used in conjuncture with the present invention is shorter than most of those of the prior art, it is similarly shaped. The forward upwardly curved portion of the skag can be inserted into a gap 69 in the forward flat portion of the bar 40. The threaded shaft 64 at the rear of the skag can then be inserted into a corresponding gap 67 in the bar 40 and a nut 65 secured to the shaft 64.

Figure 6:
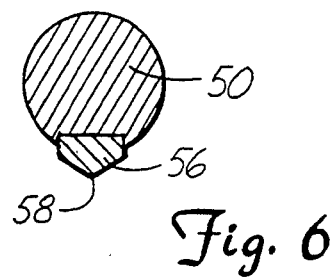
FIG. 6 is a cross-sectional view of FIG. 5, taken along line 5—5 thereof.
Figure 7:
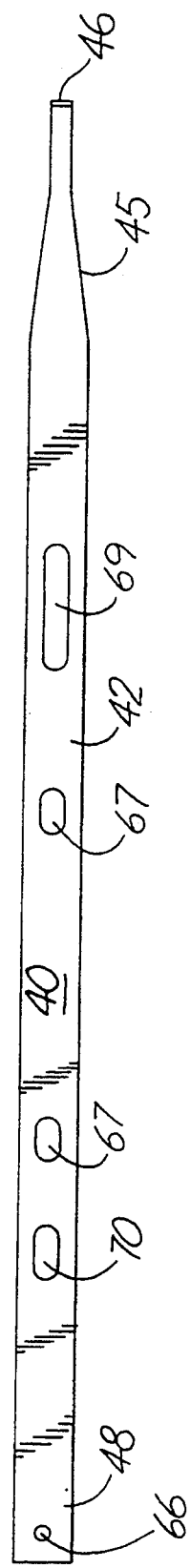

To reduce wear on the skag, a portion of the skag's middle section can be removed and replaced with a hardened material 56, preferably carbide. As shown in FIG. 6, the carbide may be shaped into a sharp edge 58 to increase steering ability on ice.

Any portion of the ski that contacts the ground will be subject to wear. Protecting the wear areas of the runner, therefore, extends the life of the runner and reduces the cost and frequency of replacing ski parts. Left exposed, the area of the runner 20 that would experience the most wear would be the portion of the runner 20 where the curved section 24 first begins to ascend away from the body portion 22. Normally this portion is protected by the skag 50. Utilizing the shorter skag of the invention, however, exposes this high-wear area. Thus, it is preferred to have the bar 40 extend forwardly past this portion of the runner to protect it from wear. Once the bar is severely worn in this spot, it is a simple matter to replace it with a new one.

As protection from the wear that the skag is subjected to, the front of the skag can be reinforced with a strip of carbide 70. Furthermore, the slot wherein the carbide steering strip 56 is situated desirably runs the entire length of the skag's bottom surface. This slot can be filled with hard weld for additional protection of the skag's wear surface.

The bar, skag and runner can be constructed of any suitable material capable of withstanding the wear and stress that they will be subjected to. Because of its strength and durability, steel is preferred.

In actual use, the flat bar 40 extending past the shorter skag 50 aids in the steerability of the snowmobile. As a snowmobile traverses the snow, the prior art skags leave a distinct impression behind. The skis of snowmobiles coming upon this track will have a tendency to follow the skag impression left previously. This phenomenon, known as "darting" or "tracking", causes the driver of the snowmobile to compensate or correct for the frequently undesired steering forces to maintain directional steerability. The present invention acts to eliminate the effects of darting by at least partially filling in any encountered tracks and at least partially filling in its own tracks left behind (FIG. 2). As the snowmobile runner of the present invention traverses the snow, the front bar 40 which extends forwardly of the skag 50 encounters the old track first and acts to at least partially crush the sides of the track so that the track is partially filled in and less defined. The skag then has a fresh trail within which to steer upon. As the snowmobile continues on, the flat bar extending beyond the skag acts in the same manner to at least partially fill in the skag impression as shown in FIG. 2.

Additionally, the shorter skag makes the snowmobile easier to steer. The shorter skag has a smaller, shorter frictional surface contacting the ground. With the shorter surface, less steering torque is required to turn the skag. The snowmobile, therefore, takes less effort to steer than a conventional long skag snowmobile.

While a preferred embodiment of the present invention has been described, it should be understood that various changes, adaptations and modifications may be made therein without departing from the spirit of the invention and the scope of the appended claims.

What is claimed is:

1. A snowmobile ski comprising:
   a longitudinally extending runner having a bottom surface;
   a generally flat, elongate bar having top and bottom surfaces, the top surface being generally contoured to abut the bottom surface of the runner;
   a steering skag extending-longitudinally along the runner beneath the bar; and
   attachment means for attaching the skag and the bar to the ski;
   the bar extending laterally and longitudinally beyond the skag so that the track left by the skag in the snow will be at least partially filled in by the bar.

2. The ski of claim 1 wherein the runner includes an upwardly curved forward end portion.

3. The ski of claim 2 wherein the bar extends forwardly of the skag to cover and protect at least a part of the bottom surface of the runner's curved portion from wear.

4. The ski of claim 1 wherein the bar extends forwardly beyond the skag so that the bar will at least partially fill in a skag track in the snow encountered by the ski.

5. The ski of claim 1 wherein the skag is generally of a circular cross section.

6. The ski of claim 5 wherein the skag has at least one strip of hardened material inserted into the positions that receive wear.

7. The ski of claim 6 wherein the strip of hardened material is carbide.

8. The ski of claim 2 wherein the bar is tapered at its forward end.

9. The ski of claim 8 wherein the tapered forward end of the bar is inserted into the curved forward end of the runner.

10. The ski of claim 8 wherein the rear end of the bar is attached to the runner by a nut and a threaded bolt.

11. The ski of claim 10 wherein the skag and bar are attached to the runner by a plurality of threaded rods, carried by the skag, which extend through slots in the bar and runner, being secured by nuts.

12. A snowmobile ski comprising:
    a longitudinally extending runner having a bottom surface and an upwardly curved forward end portion;
    a generally flat, elongate bar having top and bottom surfaces, the top surface being generally contoured to abut the bottom surface of the runner, and a tapered front end that is inserted into a complementary orifice in the runner;
    a steering skag with a generally circular cross section extending longitudinally of the runner on the bottom side of the bar, the skag being attached to the runner by a plurality of threaded rods that pass through slots in the bar and the runner, being secured to the runner by corresponding nuts;
    the bar extending laterally and longitudinally forwardly of and rearwardly beyond the skag to cover and protect at least a part of the bottom surface of the runner's forward curved portion from wear and so that the track left by the skag in the snow will be at least partially filled in by the bar and the bar will at least partially fill in a skag track in the snow encountered by the ski.

13. A snowmobile ski comprising:
    a longitudinally extending runner having a bottom surface and upwardly curved forward end;
    a generally flat, elongated bar having top and bottom surfaces and a front end portion, the top surface being generally contoured to abut the bottom surface of the runner, and the front end portion being tapered to a narrower width; and
    a steering skag secured to the runner and extending longitudinally along the runner;
    the bar being secured to the runner and extending laterally beyond the sides of the skag and longitudinally forward of the skag to cover and protect at least a part of the bottom surface of the runner's forward curved portion from wear and to at least partially fill a skag impression encountered by the ski.

14. A snowmobile ski, comprising:
    a longitudinally extending runner having a bottom surface;
    a steering skag secured to the runner and extending longitudinally along the runner; and
    a generally flat, elongate bar having top and bottom surfaces, the bar being wider than the skag and narrower than the runner, the bar being secured to the runner in a position so that at least a portion of the bar extends forwardly of the skag so that the bar will fill in a track encountered by the ski.

15. The ski of claim 14 wherein the bar tapers to a narrower width at its forward end.

16. A snowmobile ski, comprising:
    a longitudinally extending runner having a bottom surface;
    a steering skag secured to the runner and extending longitudinally along the runner;
    a generally flat, elongate bar having top and bottom surfaces, the bar being secured to the runner and extending behind the skag so that the track left by the skag will be at least partially filled in.

* * * * *